United States Patent Office 2,809,899
Patented Oct. 15, 1957

2,809,899
PLASTICIZED CELLULOSE DERIVATIVES

John D. Brandner, Arden, Del., assignor to Atlas Powder Company, Wilmington, Del., a corporation of Delaware No Drawing. Original application April 25, 1950, Serial No. 158,090, now Patent No. 2,715,139, dated August 9, 1955. Divided and this application March 24, 1955, Serial No. 496,590

6 Claims. (Cl. 106—179)

This application is a division of my copending application Serial No. 158,090, filed April 25, 1950, now U. S. Patent No. 2,715,139 and relates particularly to plasticized compositions of cellulose derivatives.

Derivatives of cellulose constitute an important class of synthetic plastics and find wide application in such diverse forms as yarns, sheets and wrapping foils, films for supporting photographic emulsions, lacquers and other coating compositions, molded objects, extruded forms, and the like. In most of such applications it is necessary that there be incorporated with the cellulose ester a plasticizing ingredient to impart flexibility, or toughness, or to improve the impact strength, or otherwise desirable modify the properties of the completed article.

It is an object of this invention to provide new organic esters.

It is a more particular object to provide new organic esters which are plasticizers for cellulose derivatives.

Another object is to provide new plasticized compositions of cellulose derivatives.

Other objects will become apparent in the course of the following description and the appended claims.

The novel plasticizers of the present invention comprise diesters of diglycolic acid which conform to the formula $$O(CH_2COO)_2{\diagup R \atop \diagdown R^1}$$

in which R is a radical selected from the group consisting of

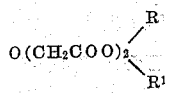

and

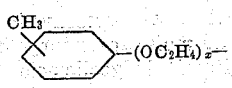

wherein x is 1 or 2, m is a whole number from 0 to 4, n is a whole number from 0 to 2, and the sum of $m + n$ is from 1 to 4; and $R^1$ is a radical selected from the group consisting of

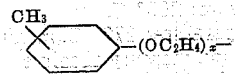

and

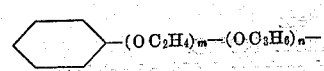

wherein x is 1 or 2, m is a whole number from 0 to 4, n is a whole number from 0 to 2, the sum of $m + n$ is from 1 to 4, and $2m+3n$ is at least 3.

Among the compounds defined by the above generic formula the following may be listed as illustrative:

Di-(cresoxy ethyl) diglycolate
Di-(cresoxy ethoxy ethyl) diglycolate
Di-(phenoxy ethoxy ethyl) diglycolate
Di-(phenoxy propyl) diglycolate
Di-(phenoxy triethoxy ethyl) diglycolate
Di-(phenoxy diethoxy propyl) diglycolate
(Phenoxy ethoxy ethyl) (phenoxy diethoxy ethyl) diglycolate Plasticizing esters of the type above defined and exemplified may be readily prepared by direct esterification of diglycolic acid with one or more ether-alcohols represented by the formulas ROH and $R^1OH$ where R and $R^1$ have the meanings above ascribed thereto. The said ether-alcohols may be purified single chemical identities or, equally satisfactorily, may be mixtures of lower oxyalkylated phenols or cresols obtained by the direct addition of the appropriate alkylene oxide to phenol or cresol. In referring to ether-alcohols so prepared and their radicals, the indicated number of oxyalkylene groups in the compound designates the average number of such groups as determined by the number of mols of oxide reacted per mol of phenolic compound. Thus the expression phenoxy ethoxy ethanol refers equally, for purposes of this specification, to the compound

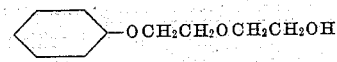

and to the mixture of ether alcohols resulting from the addition of two mols of ethylene oxide to one mol of phenol. Methods of preparing such ether-alcohols are well known and need not be elaborated here.

Equally, within the purview of the invention are diglycolic diesters of mixtures of polyolefin glycol ethers of phenol and/or cresol wherein the average number of olefin oxide groups per mol of said phenol or cresol is not a small whole number but is any fractional number within the limits indicated in the primary definition above. It will be recognized that such compositions will comprise mixtures of compounds each conforming to the generic definition above, and mixtures of such compounds are the full equivalent of the compounds singly. These and other modifications which do not depart from the spirit of the invention will be obvious to those skilled in the art.

Alternatively the plasticizing esters of the present invention may be made by other conventional means such, for example, as by reaction between diglycolic anhydride and the appropriate ether-alcohols, or between diglycolyl chloride and the appropriate ether-alcohols in the presence of an acid acceptor, or by alcoholysis of lower alkyl diglycolates with the desired ether-alcohol or mixture of ether-alcohols. Esters conforming to the generic formula above, and compositions containing such esters as defined hereinafter, are the subject of the present invention, whether the esters be prepared by any of the above indicated procedures or by other equivalent methods.

The cellulose derivative component of the novel plasticized compositions of the present invention is selected from the group consisting of cellulose nitrate, lower fatty acid esters of cellulose, and lower alkyl ethers of cellulose. Exemplifying such derivatives are ethyl cellulose, cellulose nitrate, cellulose acetate, cellulose propionate, and cellulose esters of mixed lower fatty acids, such as cellulose aceto-butyrate and the like. The new plasticizers are of particular advantage in cellulose acetate compositions and especially in cellulose acetate films. In many cases they may serve as the sole plasticizing ingredient although they are compatible with other known plasticizers for the cellulose esters and may be used in conjunction therewith. For example, suitable combination plasticizers are mixtures of the diglycolic diesters of the present invention and lower alkyl phthalates, lower alkyl phthalyl ethyl glycolates, triphenyl or tricresyl phosphate, and the like.

Also as is well understood in the art, the proportion of total plasticizer to cellulose derivative in useful compositions will vary greatly with the use to which the composition is to be put, as well as with the specific plasticizer or plasticizer combination employed. In general, however, it is preferred to employ at least 10 parts and not more than 50 parts by weight of total plasticizer per 100 parts of cellulose derivative to obtain sufficient plasticizing effect and yet not unduly weaken the composition by dilution of the cellulose derivative. Of the total plasticizer so employed, at least 25 percent, and any greater proportion up to 100% should comprise the novel diesters of diglycolic acid hereinbefore defined.

Suitable combination plasticizers containing at least 25% of the diesters of the present invention are tabulated below.

| Prior Art Plasticizer | Novel Plasticizer |
|---|---|
| 75% butyl phthalyl ethyl glycolate | 25% di(cresoxy ethyl) diglycolate. |
| 60% diethyl phthalate | 40% di(phenoxy diethoxy ethyl) diglycolate. |
| 50% dimethyl phthalate | 50% di(phenoxy ethoxy ethyl) diglycolate. |
| 25% tricresyl phosphate | 75% di(phenoxy propyl) diglycolate. |

The ester plasticizers of the present invention are unusually resistant to hydrolysis and cellulose ester compositions plasticized with mixtures containing a high proportion thereof are highly resistant to leaching by water. Moreover, such cellulose ester compositions do not suffer undue loss of plasticizer by volatilization on warm storage and are exceptionally resistant to deterioration by ultraviolet light. In film form they exhibit excellent tensile and tear strength, high folding endurance, transparency, and freedom from color. Moldings of compositions so plasticized are tough, of high impact strength, and of low water absorption.

It has been pointed out hereinbefore that the novel esters of the present invention may be prepared by any of a number of known procedures. A convenient method is to form the said esters by direct esterification between diglycolic acid and an excess of the chosen aryl-aliphatic ether-alcohol and subsequently remove the excess alcohol by distillation. The reaction mixture is first heated in an inert atmosphere and under substantially atmospheric pressure in a vessel equipped with a short fractionating column, the temperature at the head of the column being regulated to reflux substantially all of the ether-alcohol while removing water. When the acid number of the charge reaches a selected low value, preferably under 15, vacuum is applied to the system and the rate of heating increased to remove by distillation the unreacted excess of ether-alcohol. The formed ester may be conveniently treated with a decolorizing agent such as activated carbon or the like, and filtered while still warm if it is desired to obtain an ester of light color.

Within the framework of the above general description the following specific examples illustrate the preparation of esters in accordance with the present invention in more detail.

EXAMPLE I

*Diglycolic acid ester of phenoxy ethoxy ethanol*

Charge:
    546 grams (3 mols) phenoxyethoxy ethanol
    134 grams (1 mol) diglycolic acid Esterification step:
    Time: 5 hours
    Pot temperature: Rising from 140° to 230° C.
    Column temperature: 100° C.
    Acid number of charge at end: 6

Distillation step:
    Time: 1.5 hours
    Pot temperature: 230° C.
    Column temperature: 190° C. max.
    Pressure: 3 mm. mercury absolute
    Recovered phenoxyethoxy ethanol: 162 grams Decolorizing step:
    Temperature: 140° C.
    Activated carbon: 0.5% of original charge
    Time: 15 min.
    Filtration temperature: 75° C.

Final product:
    Yield: 462 grams
    Form: Pale yellow moderately viscous liquid
    Acid No.=4
    Hydroxyl No.=5
    Saponification No.=234

EXAMPLE II

*Diglycolic acid ester of phenoxy propanol*

Charge:
    304 grams (2 mols) phenoxy propanol
    107 grams (.8 mol) diglycolic acid Esterification step:
    Time: 12 hours
    Pot temperature 140° to 220° C.
    Column temperature: 100° C.
    Acid number of charge at end: 11

Distillation step:
    Time: 1 hour
    Pot temperature: 210° C.
    Column temperature: 156° C. maximum
    Pressure: 2 mm. mercury absolute
    Ether-alcohol recovered: 55 grams Decolorizing step:
    Temperature: 140° C.
    Activated carbon: 0.5% of original charge
    Time: 15 min.
    Filtration temperature: 75° C.

Final product:
    Yield: 286 grams
    Form: Pale yellow moderately viscous liquid
    Acid No.=11
    Hydroxyl No.=2
    Saponification No.=294

EXAMPLE III

*Diglycolic acid ester of mixed cresoxyethanols*

Charge:
    228 grams (1.5 mols) o-cresoxyethanol
    228 grams (1.5 mols) m-cresoxyethanol
    134 grams (1 mol) diglycolic acid Esterification step:
    Time: 6 hours
    Pot temperature: 140° to 200° C.
    Column temperature: 100° C.
    Acid number of charge at end: 11

Distillation step:
    Time: 2 hours
    Pot temperature: 200° C.
    Column temperature: 170° C. maximum
    Pressure: 2 mm. mercury absolute
    Recovered mixed cresoxyethanols: 134 grams Decolorizing step:
    Temperature: 140° C.
    Activated carbon: 0.5% of original charge
    Time: 15 min.
    Filtration temperature: 75° C.

Final product:
    Yield: 388 grams
    Form: Yellow moderately viscous liquid
    Acid No.: 7
    Hydroxyl No.: 7
    Saponification No.: 276

EXAMPLE IV

*Diglycolic acid ester of phenoxy triethoxy ethanol*

Charge:
  540 grams (2 mols) of the ether alcohol obtained by the direct addition of 4 mols of ethylene oxide to 1 mol of phenol
  121 grams (.9 mol) diglycolic acid
Esterification step:
  Time: 6 hours
  Pot temperature: 140–230° C.
  Column temperature: 100° C.
  Acid No. at end: 16
Distillation step:
  Time: 1.5 hours
  Pot temperature: 250° C. (max.)
  Column temperature: 190° C. max.
  Pressure: 2 mm. mercury absolute
  Recovered ether-alcohol: 55 grams
Decolorizing step:
  Temperature: 140° C.
  Activated carbon: 0.5 % of original charge
  Time: 15 min.
  Filtration temperature: 75° C.
Final product:
  Yield: 555 grams
  Form: Deep yellow moderately viscous liquid
  Acid number: 4
  Hydroxyl number: 11
  Saponification number: 169

The following examples are illustrative of cellulose derivative compositions plasticized with the novel plasticizers of the present invention. All indicated parts are by weight.

EXAMPLE V

*Cellulose acetate film*

18 parts of cellulose acetate having an acetic acid content of 55.6 to 56.2 percent and a viscosity of 35 to 55 seconds were dissolved in a mixed solvent consisting of:

20 parts methyl ethyl ketone
13 parts ethyl acetate
19 parts dioxane
30 parts acetone and pressure filtered to form a base solution.

9 parts of the product of Example I were dissolved in 100 parts of the base solution to yield a solution of a plasticized cellulose acetate suitable for film formation. A film of 0.045" wet thickness was cast on glass from the above solution, conditioned in a solvent atmosphere over night, and air dried for 4 hours. The film was then stripped from the glass and conditioned for 48 hours at room temperature. The resulting film was very flexible and transparent, exhibited high elongation before finally rupturing in tensile strength test, and showed excellent resistance to deterioration and discoloration under ultraviolet light. It underwent remarkably little loss by volatilization at 85° C. and low loss by solution on immersion in cold water for 16 hours.

EXAMPLE VI

The process of Example V was repeated except that 9 parts of the same plasticizer was dissolved in 200 parts of the base solution. The resulting film was somewhat tougher than that of Example V exhibiting less elongation and greater tensile strength. It was colorless, transparent and flexible, very resistant to deterioration by ultraviolet light and withstood very satisfactorily the tests for solubility in cold water and loss by volatilization.

EXAMPLE VII

The product of Example IV was substituted for the product of Example I in the process described in Example VI. The resulting film was very similar in properties to that of the film of Example VI being slightly more resistant to loss by volatilization and slightly less resistant to loss by leaching in cold water.

EXAMPLE VIII

The product of Example III was substituted for that of Example I in the film casting solution of Example VI. The resulting film was clear, flexible, and strong, unusually resistant to cold water extraction, and excellent in respect to loss by volatilization.

EXAMPLE IX

The product of Example II was substituted for that of Example I in the film casting solution of Example V. The resulting film was clear, very flexible, and strong. Its resistance to cold water leaching was excellent and its loss by volatilization was quite good.

EXAMPLE X

*Plasticized ethyl cellulose film.*—A base solution was prepared from 35 parts of 50 centipoises ethyl cellulose in 65 parts of a mixed solvent composed of:

|  | Parts |
|---|---|
| Ethanol | 12 |
| Acetone | 7 |
| Toluol | 32 |
| Ethyl acetate | 7 |
| Methyl ethyl ketone | 7 |

Seven parts of the product of Example I were dissolved in 100 parts of the base solution and a film cast from the resulting mixture according to the technique of Example V. There was obtained a clear film of good tensile strength and elongation.

EXAMPLE XI

*Plasticized cellulose acetate-butyrate film.*—Prepare a base solution by dissolving 20 parts of cellulose acetate-butyrate, characterized by a viscosity of 17–33 seconds, an average acetyl content of 13% and average butyryl content of 37%, in 80 parts of a solvent composed of:

|  | Parts |
|---|---|
| Acetone | 20 |
| Cyclohexanone | 30 |
| Ethyl acetate | 20 |
| Ethyl lactate | 5 |
| Dioxane | 5 |

Dissolve 5 parts of the product of Example I in 100 parts of the said base solution and cast films therefrom according to the technique of Example V. The resulting films are transparent, flexible, tough and of excellent physical characteristics.

EXAMPLE XII

*Plasticized cellulose nitrate film.*—Prepare a base solution by dissolving 19.5 parts of half second nitrocellulose in 70.5 parts of a mixed solvent composed of:

|  | Parts |
|---|---|
| Butyl alcohol | 10.5 |
| Butyl acetate | 20 |
| Ethyl acetate | 20 |
| Toluol | 30 |

Dissolve 3.9 grams of the product of Example I in 100 grams of the said base solution and cast a film therefrom according to the technique of Example V. The resulting film is transparent, flexible, and of excellent physical properties.

EXAMPLE XIII

*Cellulose acetate molding.*—Thirty parts of a mixture of equal parts of the product of Example I and dimethyl phthalate were absorbed in and intimately mixed with 70 parts cellulose acetate powder, the cellulose acetate being the same as that described in Example I. The mixture was introduced into a disk mold and compression molded at 430°–440° F. for 15 minutes at 5000 lbs. per square inch. The resulting disk was clear, very light in color, tough, strong and of low water absorption.

The above examples are illustrative only and many variations therefrom which do not depart from the spirit of the invention will be readily recognized by those skilled in the art. Equally within the scope of the invention are compositions of cellulose derivatives, comprising the novel plasticizers herein disclosed, and containing added ingredients, such, for example, as dyes, pigments, fillers and modifying resins.

What is claimed is:

1. A plasticized composition comprising a cellulose derivative selected from the group consisting of cellulose nitrate, cellulose esters of lower fatty acids, and lower alkyl ethers of cellulose and a plasticizer therefor comprising a diester of diglycolic acid which conforms to the formula

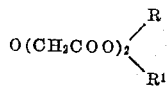

in which R is a radical selected from the group consisting of

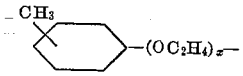

and

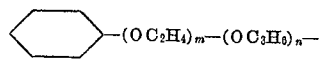

wherein $x$ is an integer greater than 0 and less than 3, $m$ is a whole number from 0 to 4, $n$ is a whole number from 0 to 2, and the sum of $m+n$ is from 1 to 4; and $R^1$ is a radical selected from the group consisting of

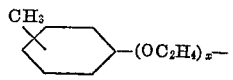

and

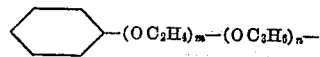

wherein $x=1$ or 2, $m$ is a whole number from 0 to 4, $n$ is a whole number from 0 to 2, the sum of $m+n$ is from 1 to 4, and $2m+3n$ is at least 3.

2. A plasticized composition as in claim 1 wherein there are present from about 10 to about 50 parts by weight of said plasticizer per 100 parts of said cellulose derivative.

3. A plasticized composition comprising 100 parts by weight of a cellulose derivative selected from the group consisting of cellulose nitrate, cellulose esters of lower fatty acids and lower alkyl ethers of cellulose, and from about 10 parts to about 50 parts by weight of total plasticizer, said plasticizer containing at least 25% by weight of a diester of diglycolic acid as defined in claim 1.

4. A plasticized composition comprising 100 parts by weight of cellulose acetate and from about 10 parts to about 50 parts by weight of di-(phenoxyethoxy ethyl) diglycolate.

5. A plasticized composition comprising 100 parts by weight of cellulose acetate and from about 10 parts to about 50 parts by weight of a mixed plasticizer consisting of 50% by weight dimethyl phthalate and 50% by weight of di-(phenoxyethoxy ethyl) diglycolate.

6. A plasticized composition comprising 100 parts by weight of cellulose acetate and from about 10 parts to about 50 parts by weight of di-(cresoxyethyl) diglycolate.

References Cited in the file of this patent

UNITED STATES PATENTS 2,589,666    Brandner _____ Mar. 18, 1952

OTHER REFERENCES

Ellis: "Chemistry of Synthetic Resins," 1935, vol. 1, p. 13.

"Cellulose Acetate Plastics," Stannett (1950), p. 43.

Ott et al.: "High Polymers," vol. V, p. III (1955), p. 1462.

"Handbook of Plastics," Simonds and Ellis (1943), pp. 252 to 271.